June 3, 1930.  N. W. PERKINS  1,761,742
SUBTRACTION CONTROL FOR CALCULATING MACHINES
Filed Jan. 28, 1926  2 Sheets-Sheet 1
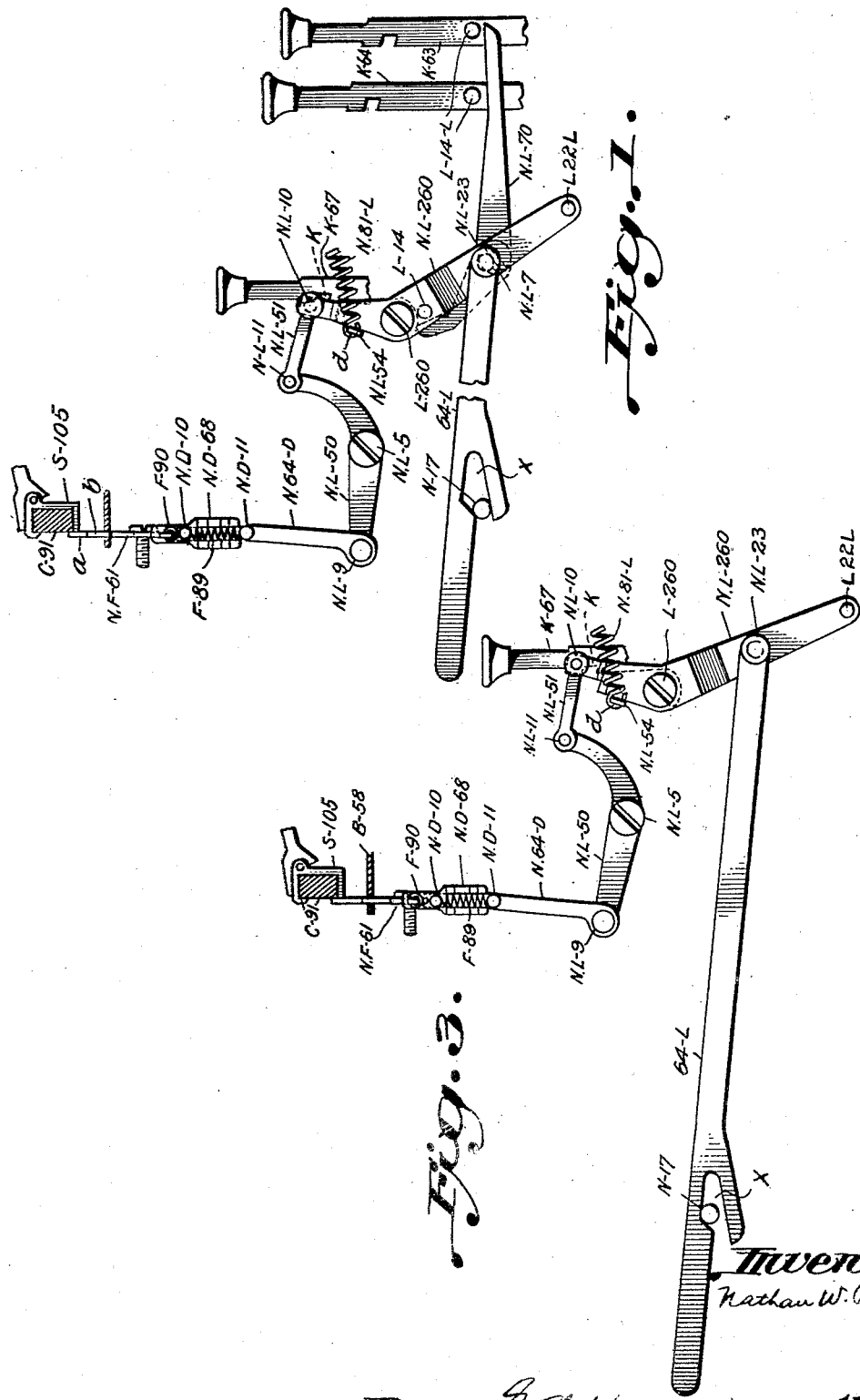
Inventor;
Nathan W. Perkins
By ...... Atty.

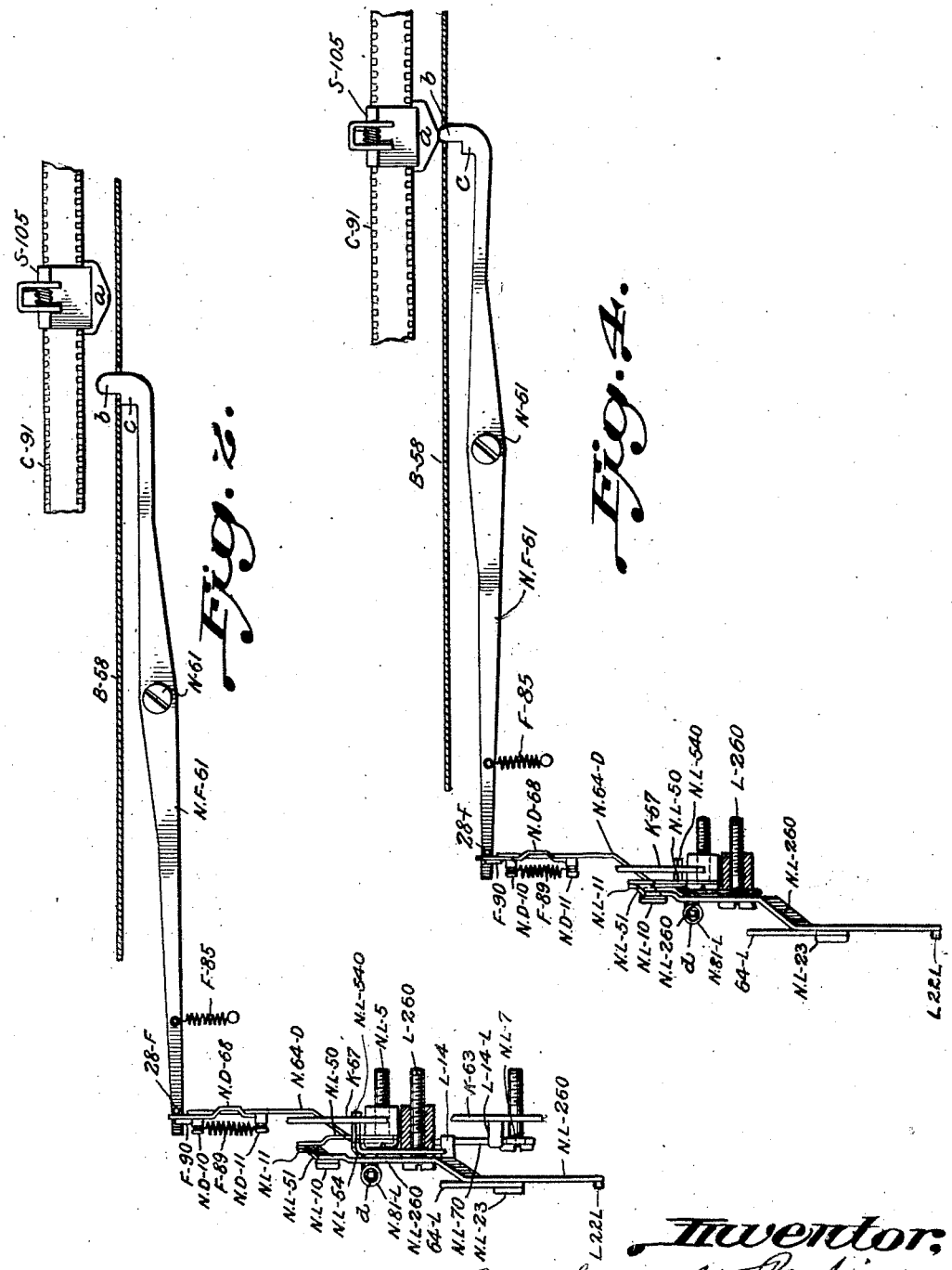

Patented June 3, 1930

1,761,742

UNITED STATES PATENT OFFICE

NATHAN W. PERKINS, OF EAST ORANGE, NEW JERSEY, ASSIGNOR TO ELLIS ADDING TYPEWRITER COMPANY, OF NEWARK, NEW JERSEY, A CORPORATION OF NEW JERSEY

SUBTRACTION CONTROL FOR CALCULATING MACHINES

Application filed January 28, 1926. Serial No. 84,471.

This invention relates to improved means for automatically setting a calculating machine so that it will be adapted to perform the operation of subtraction when the movable carriage is in a given position.

In the patent to Bernau 1,550,945, August 25, 1925, there is set forth and claimed mechanism whereby the subtraction key of a calculating machine may be automatically set when the movable carriage is in a given position so that the machine is conditioned to be adapted to perform subtraction so long as the carriage remains in the position in which it is adapted to set said key. The Bernau mechanism also proposes the use of means whereby the subtraction key may be retained in set position, when it has been depressed by reason of the carriage being in a given position, even though the carriage be moved to another position.

The aforesaid Bernau patent sets forth at length the purpose of setting the subtracting mechanism by the carriage and reference may be had thereto for a full understanding of the classes of work which may make it expedient to automatically condition the machine so that it will be adapted to subtract so long as the carriage remains in a given tabulated position. It is unnecessary, therefore, to set forth at length the purpose of an invention of this general character and it suffices to state that the purpose of the present invention is to automatically condition a calculating machine so that it will be adapted to subtract so long as the travelling carriage remains in that tabulated position where one or more subtracting operations are desired to be carried on.

Like the Bernau mechanism of Patent 1,550,945, my invention relates to the well known "Ellis" calculating machine and reference may be had to Ellis Patent 1,203,863, November 7, 1916, and the patent to Bernau 1,508,267, September 9, 1924, and the application of which said patent is a division, for a full disclosure of the Ellis type of adding and subtracting accumulator and controlling means therefor, in connection with my present improvements.

My present improvements are designed to utilize the ordinary stops which are carried by the carriage of the "Ellis" adding and subtracting machine to operate mechanism to set the machine for subtraction without having to move the key latch, the latter having a somewhat heavy spring.

My present invention differs from the construction set forth in the patent to Bernau 1,550,945, both as regards the mechanism which is operated by the carriage to condition the machine so that it will be adapted to perform subtraction and in that the mechanism does not depress the subtraction key but acts directly on the subtracting set link, instead of on the subtraction key. At the same time, the present invention does not interfere in any manner with the manual setting or depression of the subtraction key, and thus the operator may at any time condition the machine for subtraction regardless of the position of the carriage, by depressing the subtraction key.

The present improvements also embrace the combination of a carriage operating mechanism with the subtraction key mechanism as will appear hereinafter.

Unlike the mechanism of the Bernau Patent 1,550,945, my present improvements contemplate the immediate restoration of the mechanism to normal position when the carriage is moved from that position or positions where it cooperates with the mechanism, so that while the operator may at any time manually depress the subtraction key, nevertheless, unless he does so, when the carriage moves from a position where it automatically controls my mechanism, the machine is restored to a condition where it will add.

While the present improvements are particularly adapted for use in connection with the "Ellis" machine, they are not thus restricted and may be used on other calculating machines.

While the preferred embodiment of my improvements is hereinafter described and is shown in the accompanying drawings, it will be understood that modifications may be resorted to without departing from the spirit of the invention.

In the accompanying drawings:

Figure 1 is a side elevation at the left of the machine showing the present improvements combined with the tabulating or stop rail, a stop thereon, the subtraction key, the total key and sub-total key, and the subtracting set link of the Ellis machine, the parts being in normal position;

Figure 2 is a front elevation, certain parts being in section, the parts being in normal position;

Figure 3 is a view similar to Figure 1, the total and sub-total keys and certain parts being omitted, and the present mechanism shown in operated position; and Figure 4 is a front view showing the parts in the operated position.

The top of the shell or case of the calculating machine appears at B58. A section of the tabulating or stop rail which is carried by the movable carriage of the machine appears at C91. The stop rail C91 is adapted to carry one or more adjustable or settable stops S105. In the present instance only one such stop is shown, said stop having a cam shaped projection $a$. The position of the stop S105 on the rail C91, determines the position the carriage will be required to assume in order to operate the present mechanism. By adjusting the stop, subtracting operations may be carried on according to any desired position of the carriage, and obviously, more than one subtracting position may be thus predetermined according to how many of the stops S105 are used and where they are located on the bar C91.

Pivoted at N61 to the frame of the machine is a lever NF61 which has a cam point $b$ projecting up through a slot in the shell B58 in position to be engaged, and depressed, by the cam projection $a$. A shoulder $c$ limits the upward movement of the lever NF61. The lever is normally held in the position shown in Figure 2 by a spring F85 connected thereto and to the frame of the machine.

Suspended from the left hand end of the lever NF61 is a plate or piece ND68 which carries the stud ND10.

Slidable vertically through, and guided by the piece ND68 is a link N64D which has a stud ND11 connected to the stud ND10 by a coil spring F89. The link N64D is held in elevated position as shown in Figure 2, for instance, by the spring F89, the upward movement being limited by the engagement of the stud ND11 with the lower edge of the piece ND68.

Pivoted at NL5 to the frame of the machine is a rocker NL50. This rocker is pivoted at NL9 to the link N64D.

Pivoted to the frame of the machine at L260 is a lever NL260 whose upper end is pivoted at NL10 to a link NL51 which is, in turn, pivoted at NL11, to the rocker NL50.

As thus far described, it will be seen that when the point $a$ depresses the lever NF61 as shown in Figure 4, the elevation of the link N64D will rock the rocker NL50 from the position shown in Figure 1 to that shown in Figure 3, thereby swinging the lever NL260 in a clockwise direction. This movement is availed of to condition the machine so that it will subtract, when operated, and will continue to function in that fashion so long as the lever NF61 remains in its operated position illustrated in Figure 4. The movement is utilized to shift a subtracting set link 64L from the position shown in Figure 1 to the position appearing in Figure 3. The set link has a cam slot X whose margin cooperates with the stud N17 on the frame of the machine.

The operation of this set link 64L and the parts with which it cooperates, and the operation of a subtracting cam lever (not shown) by the pin L22L carried by lever NL260, to set and time the accumulator so that it will subtract will be clear on reference to Figures 1 and 2 of the patent to Bernau 1,508,267, September 9, 1924.

The adding and subtracting accumulator with which my present improvements may be used is referred to in the said Bernau patent and also in the patent to Ellis 1,203,863 of November 7, 1916.

For the purpose of utilizing the lever NL260 when the subtraction key K67 is manually depressed, that is, to provide a mechanism common to the carriage and to the subtraction key, by which the accumulator may be set for subtraction either by carriage position or manually, I provide means now to be described.

Pivoted on the same center L260 on which the lever NL260 turns, is a latching arm NL54 which is drawn in a clockwise direction by a spring N81L that is suitably connected to the frame of the machine. The latching arm NL54 has a lug $d$ which bears against the edge of the lever NL260. The arm NL54 also has a projection NL540 which extends oppositely to the projection or lug $d$ and is disposed in position to enter a notch $k$ in the subtraction key K67 when the latter is depressed by the operator. The projection NL540 is therefore adapted to lock the subtraction key in depressed position, as the tension of the spring N81L is such that it will cause this action on the setting of said key. When the latching arm NL54 is permitted to lock the key K67, the lever NL260 is swung in a clockwise direction just as it is swung when the lever NF61 is operated. The swinging of the lever NL260, as previously set forth, shifts the subtracting set link 64L from the position shown in Figure 1 to that appearing in Figure 3 and said set link arranges the accumulator to carry on subtraction. Lever NL70 which is pivoted to the side frame of the machine at NL7, has its forward end arranged beneath the pins L14L on the total and sub-total keys K63, K64. The other end of the lever NL70 engages the pin L14 carried by the lever NL260. The purpose of this construction is to reset the lever NL260 on the depression of either the total key or sub-total key, assuming that the subtraction key K67 has been previously set.

If the cam point or projection a should happen to be engaged with the end b of the lever NF61 when either of keys, K63, K64, is depressed, the spring F89 will yield due to the pull exerted by the link N64D and the lever NF61 simply remains in its depressed position.

The "Ellis" machine has several keys known as "operating" keys which, respectively, control some "operation" of the machine, such as addition, subtraction, and non-add, and while I have illustrated and described my invention in connection with but one of said keys, the subtraction key K67, I do not intend to limit the use of the particular mechanism comprising the invention as hereinafter described, to use in connection with the particular key (K67) specified.

What I claim is:

1. In a calculating machine, the combination with a travelling carriage, of spring-operated means normally subject to automatic operation by the carriage whenever the latter is in a predetermined position but being otherwise unaffected by the carriage, said means controlling the performance of an operation of the machine, and a manually operable key also adapted to control the same operation as that controlled by the carriage, control by the carriage and by the key being without dependence on each other and without interference.

2. In a calculating machine having a travelling carriage, the combination with means for directly controlling the performance of an operation of the machine, said means being arranged to be automatically actuated by the carriage when the carriage is in a given position or positions but otherwise unaffected by the carriage, of a normally inoperative manually operable key adapted for use at will to control the same operation of the machine through the medium of the aforesaid means when the carriage is in other positions than those aforesaid, the aforesaid means for controlling the performance of an operation of the machine always being conditioned for operation either by the carriage or the key, the carriage and the key also being non-interfering and, respectively, unaffecting each other when exercising their control of the aforesaid means.

3. In a calculating machine having a travelling carriage, the combination with a system of articulated members adapted, when operated, for setting the machine so that it will be conditioned to perform subtraction, said system of articulated members being subject to automatic operation by the carriage when the latter is in one or more predetermined positions, but being otherwise unaffected by the carriage, of a subtraction key which is unaffected by, and is independent of, the operation of said system of articulated members by the carriage, said subtraction key being adapted for use at will to utilize said system of articulated members when the carriage is in other positions than those aforesaid for the purpose of conditioning the machine for the performance of subtraction, the aforesaid system of articulated members always being conditioned for operation either by the carriage or by the subtraction key, the control by the carriage and by the key being without effect on each other.

4. In a calculating machine having a travelling carriage, the combination with means normally conditioned to be adapted for operation by the carriage when the latter is in a given position or positions and also for automatic restoration to normal position when the carriage has moved to another position, said means controlling the performance of an operation of the machine, of a manually operable key also adapted for controlling the performance of the same operation of the machine as controlled by the aforesaid means, said key being unaffected by the carriage and likewise unaffecting of the operation of said means by the carriage and being normally free of control by said means so that the said means may automatically restore itself to normal position when released by the carriage, the aforesaid key being adapted for use at will to effect the performance of the aforesaid operation of the machine, the aforesaid means for controlling the performance of an operation of the machine always being conditioned for operation either by the carriage or by the key.

5. In a calculating machine, the combination with a travelling carriage, of means adapted, when operated, to set the machine for an operation of subtraction, a manually operable key adapted to operate said means, said key being unaffected by the action of the aforesaid means and unaffected by the carriage, and self-restoring other means normally set for operation by the carriage when the latter is in a predetermined position and also adapted for operating the first-named means independently of the operation thereof by said key, the key likewise unaffecting the operation of the first-named means by the carriage.

6. In a calculating machine having a travelling carriage and an accumulator which is capable of use irrespective of the position of the said carriage, the combination with means for setting the accumulator for the performance of a mathematical operation, of an auxiliary means arranged to be automatically actuated by the carriage when the carriage is in a given position or positions, but otherwise unaffected by the carriage, said auxiliary means being adapted to actuate the means for setting the accumulator, and a manually operable key adapted for use at will to actuate the aforesaid means for setting the accumulator regardless of the position of the carriage, the carriage and the key being non-dependent on each other, non-interfering and, respectively unaffecting each other when exercising their control over the means for setting the accumulator or at any other time.

7. In a calculating machine having a travelling carriage and an accumulator which is capable of use irrespective of the position of the said carriage, the combination with means for setting the accumulator for the performance of a subtracting operation, of an auxiliary means arranged to be automatically actuated by the carriage when the carriage is in a given position or positions, but otherwise unaffected by the carriage, said auxiliary means being adapted to actuate the means for setting the accumulator, and a manually operable key adapted for use at will to actuate the aforesaid means for setting the accumulator to perform a subtracting operation regardless of the position of the carriage, the carriage and the key being non-dependent on each other, non-interfering and, respectively unaffecting each other when exercising their control over the means for setting the accumulator or at any other time.

In testimony whereof I affix my signature.

NATHAN W. PERKINS.